United States Patent [19]

Dickirson

[11] Patent Number: 4,487,437
[45] Date of Patent: Dec. 11, 1984

[54] THREADLESS CONNECTOR

[75] Inventor: Gene D. Dickirson, Garden City, Mich.

[73] Assignee: Ford Motor Company, Dearborn, Mich.

[21] Appl. No.: 333,843

[22] Filed: Dec. 23, 1981

[51] Int. Cl.³ ............................................. F16L 21/02
[52] U.S. Cl. .................................... 285/319; 285/321; 285/351; 285/DIG. 22
[58] Field of Search .............. 285/319, 351, 321, 322, 285/DIG. 22

[56] References Cited

U.S. PATENT DOCUMENTS 2,727,761 12/1955 Elliott et al. ..................... 285/322 X
3,603,621 9/1971 Parsons ....................... 285/DIG. 22
4,035,005 7/1977 DeVincent et al. ................ 285/319
4,055,359 10/1977 McWethy ....................... 285/351 X
4,275,907 6/1981 Hunt ............................... 285/319 X Primary Examiner—Richard J. Scanlan, Jr.
Attorney, Agent, or Firm—Frank G. McKenzie; Donald J. Harrington

[57] ABSTRACT

A quick-connect coupling for connecting and hydraulically sealing two tubes that carry fluid has a spring member fixed to the end of one tube and a latch member having inclined surfaces formed at the end of the second tube. The second tube is fitted over the first tube and is inserted within the spring element allowing the element to be resiliently deflected on the inclined surfaces as the second tube is moved axially toward the first tube during assembly. The spring member applies a force to the second inclined surface that tends to force the second tube toward the first tube and the spring member into contact with a locking surface on the latch member.

12 Claims, 7 Drawing Figures

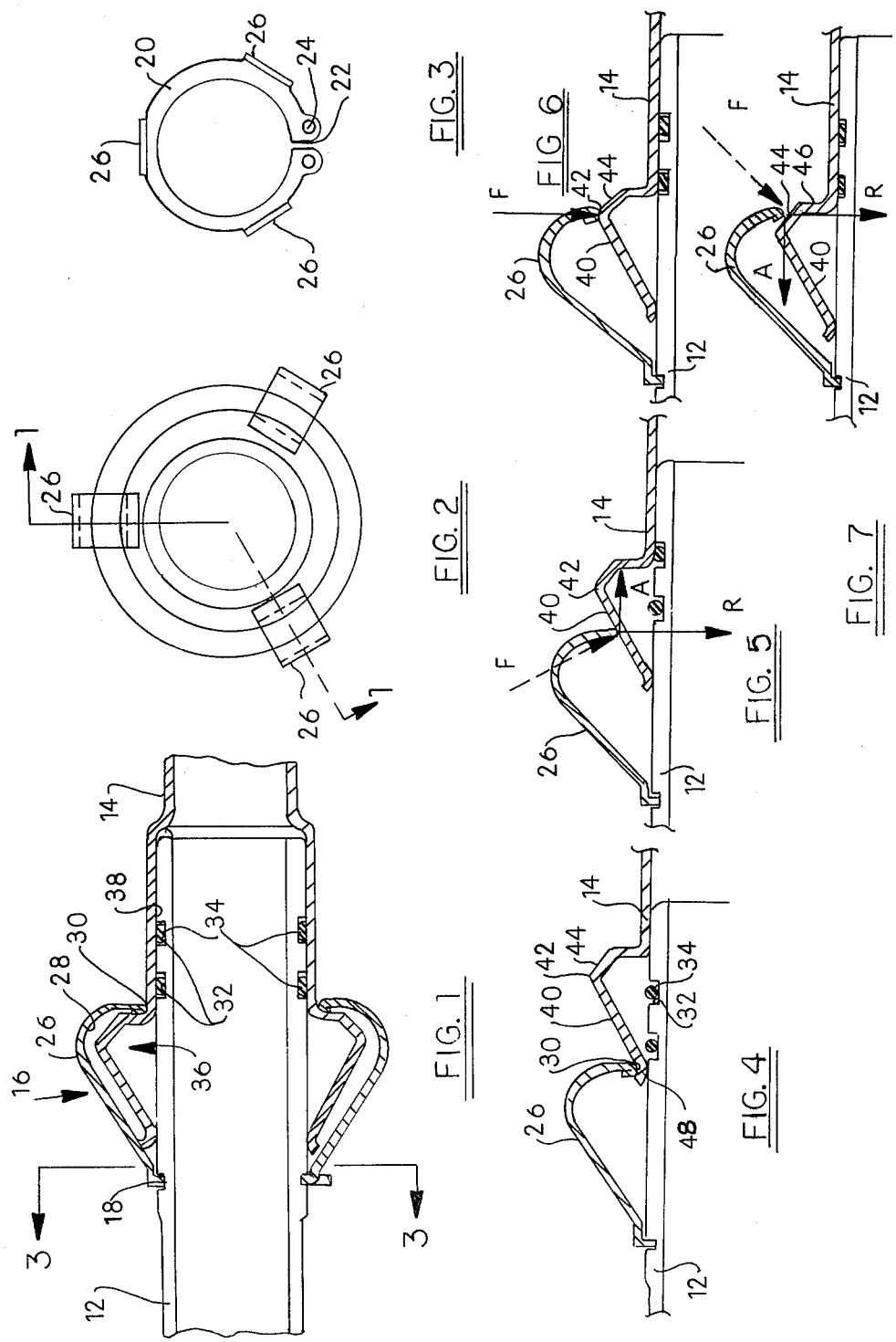

THREADLESS CONNECTOR

BACKGROUND OF THE INVENTION

1. Field of the Invention

The present invention relates to couplings for joining tubes that carry fluid and more particularly to the field of quick-connect couplings of this type.

2. Description of the Prior Art

The tubular coupling described in U.S. Pat. No. 4,055,359 permits a fluid-tight connection to be made between the tubes by hand in a short time. In making this connection the operator applies axial force to one of the tubes and a resistant force in the opposite direction to the other tube. This action causes a garter spring to expand around the flared end of one of the tubes and into a locking position within a cage member. It is necessary in joints of this type that carry pressurized fluid that a positive hydraulic seal be an integral part of the joint. The coupling described in the patent includes at least one O-ring received in a groove formed in one tube. The O-ring is compressed when the second tube is inserted over the first tube with an interference fit between the O-ring and a second tube.

One problem with this coupling arises because of the frictional contact between the O-rings and the metal tube end. The O-rings are compressed in order to produce the required seal but this compression produces a frictional force between the O-rings and the second tube. The magnitude of the force is sufficient to hold the tube ends together even though the garter spring has not been expanded over the flared end of the second tube and into its locking position. Often in the assembly process it has been discovered that the coupling gives the appearance of a properly connected coupling because the frictional forces hold the tube ends in substantially the same relative positions they would have if the connection were properly made. If the garter spring has not been forced to its locking position the tube ends retained only by the friction force are readily separated when the fluid circuit is pressurized under operating conditions. Loss of the fluid carried in the system requires its replacement and time is required to locate the source of the leak and to properly connect the coupling.

A threadless coupling for joining two tubes would preferably apply a force during assembly to the tube ends tending to overcome the frictional force that develops between the O-rings and the second tube that compresses them. Furthermore, a joint of this type would preferably provide means for readily observing the latching members of the coupling to assure that they are properly located and that a positive connection is made.

SUMMARY OF THE INVENTION

The coupling according to the present invention is used to join first and second tubes that are members of a hydraulic system that carries fluid under pressure. A spring member has an annular portion that is fitted over the outer surface of a first tube near its end and fixed to the tue against relative axial displacement. The spring member has multiple resilient spring elements that extend axially and are disposed angularly around the circumference of the first tube. The second tube has a latch member including multiple inclined surfaces that are brought into contact with the resilient elements of the spring member as the latch member is moved axially within the spring member. A first inclined surface and the spring elements develop a force on the latch member tending to drive the second tube axially away from the first tube. This force tends to overcome the frictional force developed between the O-ring seals and the surface of the tube member that contacts the seals. At the end of the first inclined surface is located a second inclined surface having a slope opposite to that of the first surface. Therefore, when the resilient elements contact the second inclined surface, the force applied to the latch element tends to force the latch further within the spring and into its locking position.

The latch elements occupy only a portion of the circumference around the first tube. Hence, the connection made between the spring elements and the latch member can be readily observed by viewing the connector from the side.

BRIEF DESCRIPTION OF THE DRAWING

FIG. 1 is a longitudinal cross section taken at plane I—I of FIG. 2 through the components of a threadless connector for joining tubular members according to the present invention showing the coupling in the assembled condition.

FIG. 2 is an end view of the assembled connector shown in FIG. 1.

FIG. 3 is a cross section taken at plane 3—3 of FIG. 1.

FIG. 4 is a cross section through the coupling showing the latch first contacting the spring means.

FIG. 5 is a cross section showing a later stage in the assembly of the connector wherein the spring means has moved resiliently into contact with the first inclined surface of the latch member.

FIG. 6 is a cross section showing a later stage in the assembly procedure wherein the spring means is resting at the apex of the first inclined surface.

FIG. 7 is a cross section showing a still later position in the assembly procedure wherein the spring means is contacting the second inclined surface of the latch member.

DETAILED DESCRIPTION OF THE PREFERRED EMBODIMENT

Referring first to FIG. 1, the coupling according to the present invention is adapted to connect a first tube 12 and a second tube 14. The connector includes a spring member 16 formed of spring steel sheet mounted within grooves 18 formed on the outer surface of the first tube. The spring member includes an annular portion 20 having a radial slot 22 and tool holes 24 thus permitting engagement by a tool such as pliers that expand the ring over the outer surface of the first tube and allows it to contract within the grooves 18. The grooves prevent axial displacement of the spring member on the first tube. The spring member 16 includes multiple resilient radially extending members 26 spaced angularly around the outer surface of the first tube, each member defining a space 28 therewithin and having an opening 30 facing the first tube end.

The first tube is formed with seal grooves into which are fitted elastomeric O-rings that are compressed within the grooves as the end of the second tube is slidably mounted over the end of the first tube. The second tube is formed with a latch member 36 and a cylindrical portion 38 that engages the cylindrical outer surface of the first tube end and compresses the O-rings when the coupling is assembled. Latch member 36 is formed with a first inclined surface 40 having an apex 42 at one axial end and a flange 48 turned radially outward at the opposite axial end. The smooth radial contour on flange 48 permits the second tube to be moved across the surface of the O-rings, which protrude above the cylindrical contour of the first tube, without obstructing and preventing the sliding motion. The radial height of flange 48 permits clearance of the latch member under opening 30. The end of spring members 26 rests on the outer surface of latch 36 and maintains resilient contact with the latch throughout the assembly process.

FIGS. 4-7 illustrate the procedure of assembly of the coupling and FIG. 1 shows the coupling properly connected. After flange 48 has been inserted within opening 30, axial force applied to the second tube causes spring members 26 to deflect radially outward as surface 40 is moved within space 28.

FIG. 5 illustrates the sense of direction of the resultant force F applied to surface 40 by spring member 26 and the axial A and radial R components of force F. While spring member 26 contacts the surface 40, force F tends to cause the second tube to be displaced axially outward from the first tube in opposition to the frictional force developed between the compressed O-ring and the second tube.

Further axially inward movement of the latch member will eventually bring the spring members 26 into contact with apex 42 of the latch where resultant force F is directed radially as shown in FIG. 6.

When the latch is moved further within space 28, spring member 26 contacts a second inclined surface 44, whereupon force F assumes the directional sense shown in FIG. 7, whereby the axial component A tends to force the coupling toward the locking position shown in FIG. 1. Therefore, after the apex of the inclined surfaces is moved past the contacting point of the spring element 26, the resilient force of member 26 tends to cause the coupling to be properly connected. When element 26 moves to the end of surface 44 it contacts the radial surface 46 thereby preventing axial withdrawal of the second tube from the first tube.

The coupling can be readily inspected to assure that the end of spring member 26 is properly seated on surface 46 because the spring elements are spaced from one another and permit the latch and spring element to be seen when viewed from the side.

Having described a preferred embodiment of my invention what I claim and desire to secure by U.S. Letters Patent is:

1. A coupling for connecting first and second members comprising:
   spring means mounted on the first member and fixed against axial displacement relative to the first member having at least one leg with a free end adapted to move resiliently away from and toward the outer surface of the first member, said leg defining a space between said leg and the first member; and
   latch means fixed to the second member having a first inclined surface contacted by said leg as the latch means is inserted within the spring means space and on which said leg is moved away from the first member, a second inclined planar surface and located axially adjacent and intersecting the first surface whose length extends substantially away from said intersection, contacted by said leg as the latch means is inserted further within the spring means and on which said leg moves toward the first member, and a locking surface located axially adjacent the second surface providing a surface over which the spring means latches after the latch means is inserted yet further within the spring means, whereby disconnection of the spring means and latch means is prevented due to contact of said leg with said locking surface.

2. The coupling of claim 1 further comprising a groove formed near the end of the first member; and
   resilient seal means fitted within and retained in the groove extending above the surface of the groove whereby the seal means is compressed between the groove and the second member.

3. The coupling of claim 1 wherein the first inclined surface is directed radially outward from the first and second members and axially toward the second member, and the second surface is directed radially inward toward the first and second members and axially toward the second member thereby having a slope that is opposite of that of the first inclined surface.

4. The coupling of claim 1 wherein the locking surface is radially directed and located axially beyond the apex of the first inclined surface and the spring means resiliently clears the apex prior to engaging the locking surface.

5. The coupling of claim 1 wherein the first surface and the second surface intersect at an apex that is located radially outward of the first surface and the second surface, the apex being contacted by a leg of the spring means as the latch means is inserted within the spring means, the leg being resiliently urged away from the apex and into contact with the first surface or the second surface as the first member or the second member is moved axially with respect to the other member.

6. The coupling of claim 3 wherein the first surface and the second surface intersect at an apex that is located radially outward of the first and second surfaces, the apex being contacted by a leg of the spring means as the latch means is inserted within the spring means, the leg being resiliently urged away from the apex and into contact with the first surface or the second surface as the first member or the second member is moved axially with respect to the other member.

7. The coupling of claim 1 wherein the leg, while in contact with the first surface, applies a force to the first surface tending to force the first member and the second members apart, and the leg, while in contact with the second surface, applies a force to the second surface tending to connect the first member and the second member.

8. The coupling of claim 1 wherein disconnection of the spring means and latch means is prevented due to contact of a leg of the spring member with said locking surface and without additional locking means.

9. The coupling of claim 1 wherein the first surface and the second surface are inclined surfaces extending outward from the first member or the second member and intersect at a line.

10. The coupling of claim 1 wherein the second surface and the locking surface intersect at a line.

11. The coupling of claim 1 wherein the first surface and the second surface are surfaces extending outward from the first member or the second member and intersect at a line and wherein the second surface and the locking surface intersect at a line.

12. A coupling for joining first and second tubes comprising:
   spring means mounted against axial displacement on the first tube near one end thereof having at least one resilient member defining a space therewithin and an opening facing the first tube end; and latch means fixed to the end of the second tube having a first inclined surface that contacts the spring means and causing the opening to resiliently increase in size as the latch means is inserted within the spring means, a second inclined planar surface contacted by the spring means as the latch means is further inserted within the spring means and whose length extends substantially away from said first inclined surface, the second surface having a force applied thereto by the spring means tending to cause the latch means to become inserted further within the spring means, and a locking surface resiliently engageable by the spring means upon inserting the latch means within the space yet further, whereby the spring means and latch means are prevented from being disconnected due to the contact of the spring means on the locking surface of the latch means.

* * * * *